United States Patent
Azami et al.

(10) Patent No.: US 7,501,024 B2
(45) Date of Patent: Mar. 10, 2009

(54) CARBON NANOHORN PRODUCING DEVICE AND CARBON NANOHORN PRODUCING METHOD

(75) Inventors: Takeshi Azami, Tokyo (JP); Daisuke Kasuya, Tokyo (JP); Sumio Iijima, Tokyo (JP); Tsutomu Yoshitake, Tokyo (JP); Yoshimi Kubo, Tokyo (JP); Masako Yudasaka, Tokyo (JP)

(73) Assignee: NEC Corporation, Tokyo (JP)

( * ) Notice: Subject to any disclaimer, the term of this patent is extended or adjusted under 35 U.S.C. 154(b) by 292 days.

(21) Appl. No.: 10/556,088

(22) PCT Filed: May 19, 2004

(86) PCT No.: PCT/JP2004/006744

§ 371 (c)(1),
(2), (4) Date: Nov. 9, 2005

(87) PCT Pub. No.: WO2004/103902

PCT Pub. Date: Feb. 12, 2004

(65) Prior Publication Data

US 2007/0003469 A1    Jan. 4, 2007

(30) Foreign Application Priority Data

May 20, 2003   (JP) ............................. 2003-142450

(51) Int. Cl.
*C30B 25/06* (2006.01)
(52) U.S. Cl. ............ 117/109; 117/105; 117/200; 117/201; 117/203; 423/447
(58) Field of Classification Search ............. 117/200, 117/201, 203, 105, 109; 423/447
See application file for complete search history.

(56) References Cited

U.S. PATENT DOCUMENTS 5,605,759 A    2/1997   Prince et al.
7,288,502 B2 * 10/2007  Okanobori et al. .......... 502/185

(Continued)

FOREIGN PATENT DOCUMENTS

JP        2001-064004        3/2001

(Continued)

OTHER PUBLICATIONS

R. Birringer et al., "Nanocrystalline Materials—An Approach to a Novel Solid Structure with Gas-Like Disorder?", vol. 102A, No. 8, Physics Letters, 1984, p. 365.

(Continued)

*Primary Examiner*—Robert M Kunemund
(74) *Attorney, Agent, or Firm*—Young & Thompson

(57) ABSTRACT

A plume (109) is generated by irradiating a side face of a graphite rod (101) with a laser beam (103) to vaporize carbon. The vaporized carbon is introduced to a carbon nanohorn recovery chamber (119) through a recovery pipe (155), and the vaporized carbon is recovered as a carbon nanohorn assembly (117). A cooling tank (150) including liquid nitrogen (151) is arranged in the recovery pipe (155). While the cooling tank (150) controls the plume (109) at a low temperature, the cooling tank (150) cools the carbon vapor when the carbon vapor passes through the recovery pipe (155). The cooled carbon vapor is recovered as the carbon nanohorn assembly (117) which is controlled in the desired shape and dimensions.

16 Claims, 10 Drawing Sheets

U.S. PATENT DOCUMENTS

2003/0188963 A1 * 10/2003 Takikawa et al. ............ 204/164

FOREIGN PATENT DOCUMENTS

JP        2003-020215        1/2003

OTHER PUBLICATIONS

"Nano-aggregates of single-walled graphitic caron nano-horns" by S. Iijima, M. Yudasaka, R. Yamada, S. Bandow, K. Suenaga, F. Kokai, K. Takahashi, Apr. 5, 1999 p. 165-170.

"The effect pf heat on the producing single-wall carbon nanohorn (SWNH) aggregates" by Daisuke Kasuya, Masako Yudasaka, Kunimitsu Takahashi, Fumio Kokai, Sumio Iijima, Jul. 17, 2002.

"Selective Production of Single-Wall Carbon Nanohorn Aggregates and Their Formation Mechanism" by Daisuke Kasuya, Masako Yudasaka, Kunimitsu Takahashi, Fumio Kokai, Sumio Iijima, 2002 p. 4947-4951.

* cited by examiner

CARBON NANOHORN PRODUCING DEVICE AND CARBON NANOHORN PRODUCING METHOD

TECHNICAL FIELD

The present invention relates to a carbon nanohorn producing apparatus and method of producing a carbon nanohorn.

BACKGROUND ART

Recently technological application of nanocarbon has been actively investigated. The nanocarbon is a carbon substance having a nanoscale fine structure, typified by a carbon nanotube, a carbon nanohorn, and the like. The carbon nanohorn has a tubular structure like a carbon nanotube, formed by a cylindrically rounded graphite sheet and one end of the carbon nanohorn is formed in a circular conic shape. The carbon has a specific character and is expected to be applied to various technical fields. Usually the carbon nanohorn is aggregated in a form so that the circular conic portion is projected like a horn while the tube is located in the center by Van der Waals force between circular conic portions. Hereinafter the aggregation is referred to as "carbon nanohorn assembly."

It has been reported that the carbon nanohorn assembly is produced by a laser ablation method of irradiating the carbon substance (hereinafter also referred to as "graphite target") of a raw material with a laser beam in an inert gas atmosphere (Patent Document 1).

However, in the conventional laser ablation method, production efficiency is not sufficiently improved, and there is a problem in large-scale production. Particularly, purities of the carbon nanohorn included in the product are not sufficient, that causes a long time for a purification process. Graphite and amorphous carbon are contained in soot generated by the laser ablation method besides the single-layer carbon nanohorn. In order to industrially utilize the carbon nanohorn, it is necessary that the impurities be removed through the purification process. Usually the purification is performed by an oxygen treatment. However, it takes a long time to perform the purification process. For example, currently the purification of the soot of 10 grams is required one day or more, and it is difficult to efficiently obtain the carbon nanohorn.

Further, fluctuations in quality and property of the obtained carbon nanohorn are relatively large in the conventional method, so that there is still room for improvement from the viewpoint of quality stability.

For example, in the conventional technology, it is difficult to obtain carbon nanohorns with even lengths. Further, it is extremely difficult to controll properties of the carbon nanohorn depending on the horn length.

There is also the problem that structures except for the carbon nanohorn remain in the carbon nanohorn assembly. According to TEM (Transmission Electron Microscope) observation performed by the inventors, it comes obvious that densely aggregated graphite sheets, having no horn structure, exists in the central portion of the carbon nanohorn assembly produced by the conventional method. That is, after oxidation heat treatment is performed at 575° C. to the carbon nanohorn obtained by the conventional laser ablation method, when the TEM observation is performed, it is found that a point which is not oxidized exists in the central portion of the assembly while the oxidation progresses in a surface portion. This suggests that the dense structure of the graphite sheet having no horn structure exists in the central portion of the carbon nanohorn assembly produced by the conventional method.

Patent Document 1: Japanese patent publication laid-open No. 2001-64004

SUMMARY OF THE INVENTION

In view of the foregoing, an object of the invention is to provide a technique to stably produce the carbon nanohorn assembly. Another object of the invention is to provide a provide a technique to produce the carbon nanohorn assembly having a desired shape with good controllability.

According to the invention, there is provided a carbon nanohorn producing apparatus comprising:

a target holding unit which holds a graphite target;

a light source which irradiates a surface of said graphite target with light;

a cooling unit which cools carbon vapor vaporized from said graphite target by said light irradiation; and a recovery unit which recovers said carbon vapor cooled by the cooling unit to obtain a carbon nanohorn.

Since the apparatus according to the invention includes the cooling unit which cools the carbon vapor vaporized from the graphite target, the carbon nanohorn can be obtained at good yield. As used herein, "yield" should mean a ratio of the carbon nanohorn contained in the recovered nanocarbon. The fact that the yield is improved by having the cooling unit is confirmed by experiments of the inventor. Although the reason why the yield is improved can not be clearly understood, it is presumed that a generation rate of structures except for the carbon nanohorn can relatively be decreased by controlling the temperature of the carbon vapor vaporized.

According to the apparatus of the invention, the carbon nanohorn assembly, which has the carbon nanohorn structure even inside the assembly, can be obtained. In the conventional apparatus, the inside of the obtained nanocarbon assembly often has the structure which is not the carbon nanohorn, and a ratio (purity) of the carbon nanohorn included in one assembly is not always high. According to the invention, the high-purity carbon nanohorn assembly can be obtained.

In a carbon nanohorn producing apparatus of the invention, the recovery unit may include a recovery chamber and recovery pipe which introduces said carbon vapor to said recovery chamber and said cooling unit can be configured to cool at least an inside of said recovery pipe. Therefore, the carbon vapor cooled through the recovery pipe can be selected and introduced to the recovery chamber, and the high-purity carbon nanohorn can be obtained at high yield.

The carbon nanohorn producing apparatus of the invention may be configured to arrange one end of said recovery pipe near said graphite target. Therefore, the carbon vapor vaporized from the target can be recovered from the recovery pipe with good efficiency.

The carbon nanohorn producing apparatus of the invention may include a generation chamber in which said graphite target is placed wherein said recovery chamber and said generation chamber are communicated with each other through said recovery pipe. Therefore, the carbon nanohorn having high impurity concentration, generated in the generation chamber, is prevented from mixing, and the carbon nanohorn can be obtained at high yield.

The cooling unit can be formed in various shapes. For example, the cooling unit may be a tank or a cooling pipe which are provided in the recovery pipe, the tank or the cooling pipe including a coolant. Alternatively, the cooling unit can include a vaporizing member which vaporizes liquefied gas to supply the gas to a neighborhood of said graphite target. Therefore, the carbon vapor can efficiently be cooled to obtain the carbon nanohorn having the desired property. "Provided in the recovery pipe" should mean the state in which the tank or the cooling pipe is provided in the inside, the outer surface, or the like of the recovery pipe.

Further, according to the invention, a carbon nanohorn producing method characterized by including: irradiating a surface of a graphite target with light; vaporizing carbon vapor from said graphite target; and obtaining a carbon nanohorn by cooling said carbon vapor to recover said carbon vapor.

According to the invention, the carbon nanohorn assembly can be produced stably. The carbon nanohorn assembly having the desired property can also be produced with good controllability.

Thus, according to the invention, the carbon nanohorn can be produced stably. Further, according to the invention, the carbon nanohorn assembly having the desired property can be produced with good controllability.

The above and other objects, features, and advantages of the invention will be apparent from the following description of preferred embodiments and appended drawings below.

BEST MODE FOR CARRYING OUT THE INVENTION

Figure 1:
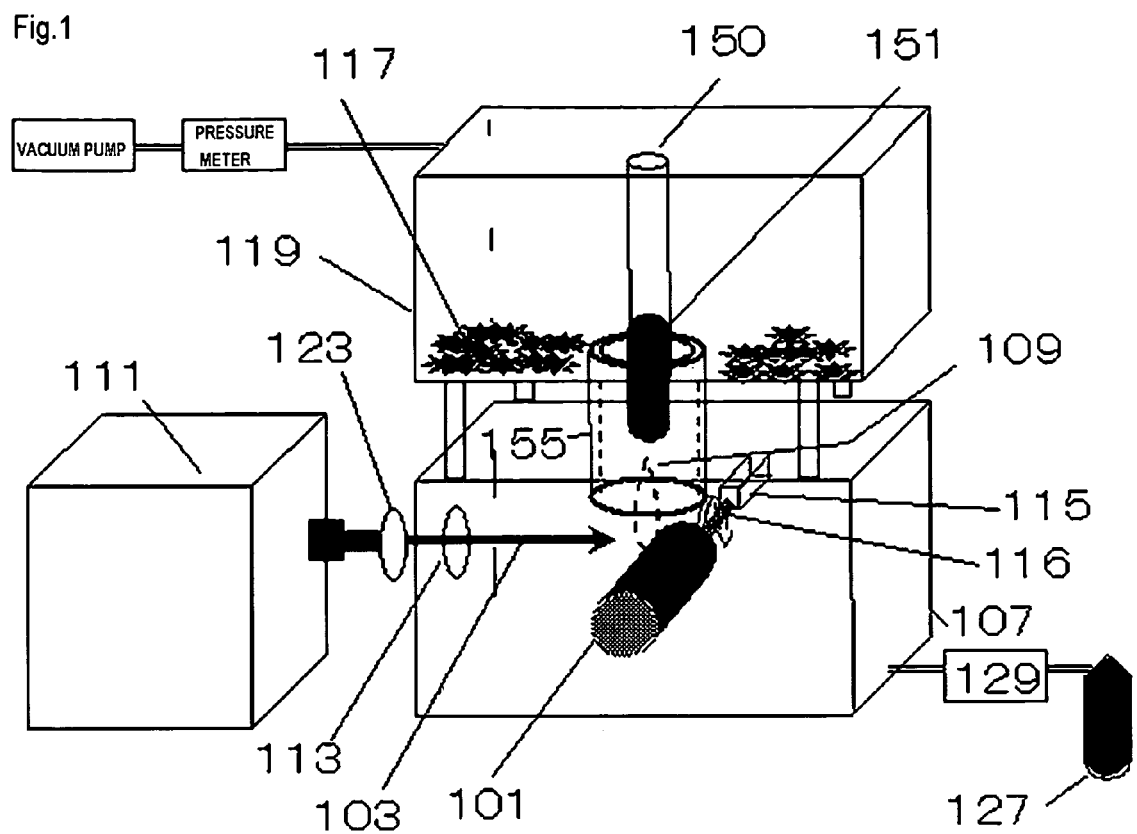
FIG. 1 is a view showing a configuration of a carbon nanohorn producing apparatus according to an embodiment.

Embodiments of the invention will be described below with reference to the drawings. In the following descriptions, the component designated by the same reference numeral basically has the same function, so that the description will not be shown.

FIRST EMBODIMENT

FIG. 1 is a view showing an example of a configuration of the carbon nanohorn producing apparatus. The producing apparatus of FIG. 1 has a structure in which a producing chamber 107 and a carbon nanohorn recovery chamber 119 are coupled with each other through a recovery pipe 155.

An inert gas supply unit 127 introduces argon into the producing chamber 107 through a flowmeter 129. The inert gas supply unit 127 causes a predetermined amount of argon to flow continuously during the production of the carbon nanohorn.

A graphite rod 101 supported by a target support member 116 is arranged in the producing chamber 107. The graphite rod 101 has a cylindrical shape, and the graphite rod 101 is driven in a rotating manner by a rotating device 115.

A laser beam 103 outgoing from a laser beam source 111 is transmitted through a ZnSe lens 123 and a ZnSe window 113, and a side face of the graphite rod 101 is irradiated with the laser beam 103. The ZnSe lens 123 focuses the laser beam 103. The ZnSe window 113 is a window which introduces the laser beam 103 into the producing chamber 107. Carbon is vaporized to generate a plume 109 from the side face of the graphite rod 101 irradiated with laser beam 103. At this point, the plume 109 is generated in a direction perpendicular to a tangent of the graphite rod 101 at a radiation position of the laser beam 103.

Figure 9:
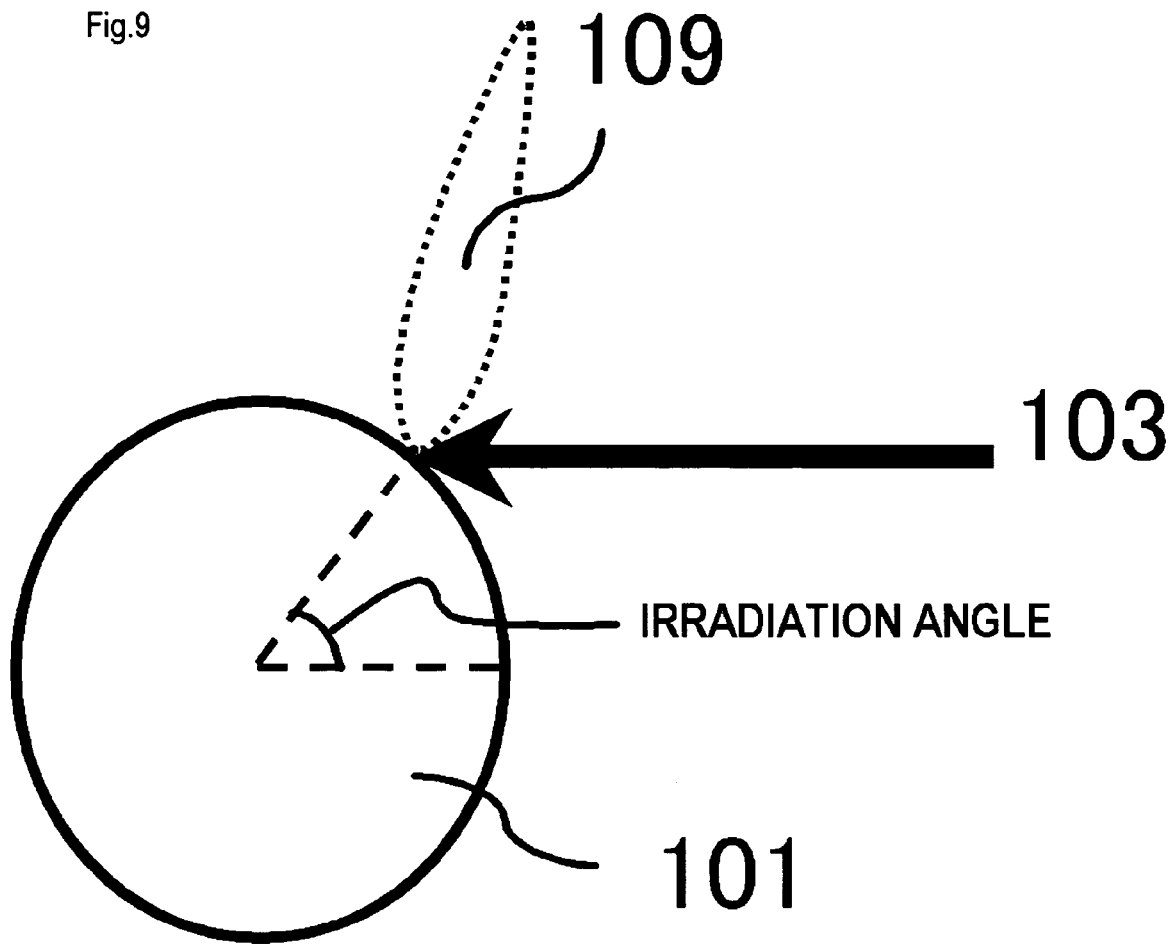
FIG. 9 is a view explaining a definition of an irradiation angle.

It is preferable that an irradiation angle of the laser beam 103 ranged from 30° to 60°. As shown in FIG. 9, in a cross section perpendicular to a lengthwise direction of the graphite rod 101, the irradiation angle is defined as an angle formed by a line segment connecting the radiation position and the center of a circle and a horizontal plane. Setting the irradiation angle to 30° or more can prevent the reflection of the laser beam 103, that is, optical feedback. Further, the generated plume 109 can be prevented from directly striking the lens 123 through the laser beam window 113. Therefore, the setting the irradiation angle as above mentioned is effective for protecting the lens 123 and adhering of a carbon nanohorn assembly 117 to the laser beam window 113. The irradiation of the graphite rod 101 with the laser beam 103 at angles not more than 60° can suppress the generation of amorphous carbon to improve the ratio of the carbon nanohorn assembly 117 in the product, that is, the yield of the carbon nanohorn assembly 117. It is particularly preferable that the irradiation angle ranges from 40° to 50°. The irradiation with the laser beam 103 at the angle around 45° can further improve the ratio of the carbon nanohorn assembly 117 in the product. The yield of the carbon nanohorn can be measured as follows: After the carbon nanohorn is dispersed in a liquid by ultrasonic, the liquid is spread on a sample stage to perform TEM observation. For example, magnification is set at about 30000 times. Because a part having the carbon nanohorn structure is clearly distinguished from a part having no carbon nanohorn structure by appearance observation, the yield can be measured from an area ratio of each part.

A recovery pipe 155 is provided toward a generation direction of the plume 109 so as to cover a part of the plume 109. The generation direction of the plume 109 is perpendicular to the tangent of the graphite rod 101 at the radiation position of the laser beam 103. The recovery pipe 155 is formed in the cylindrical shape. However, the recovery pipes 155 having the various shapes can be used. Therefore, the vaporized carbon is efficiently introduced to the carbon nanohorn recovery chamber 119 through the recovery pipe 155, and the vaporized carbon is efficiently recovered as the carbon nanohorn assembly 117.

A cooling tank 150 containing liquid nitrogen 151 is arranged in the recovery pipe 155. The cooling tank 150 controls the plume 109 at low temperature, and cools the carbon vapor when the carbon vapor passes through recovery pipe 155. The cooled carbon vapor is recovered as the carbon nanohorn assembly 117, which is controlled in the desired shape and dimension.

Figure 5:
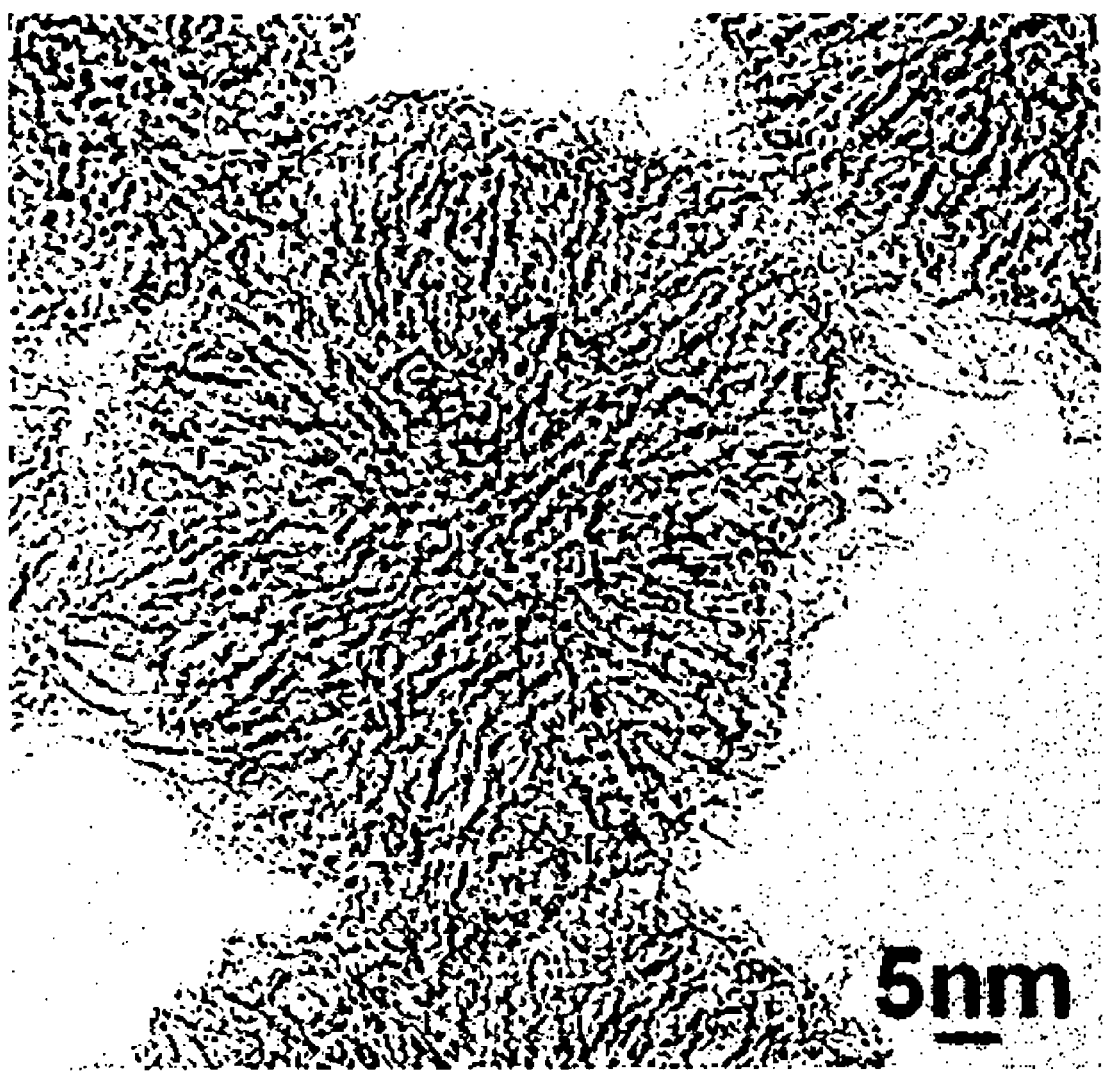
FIG. 5 is a view showing a TEM observation result showing a structure of the carbon nanohorn obtained in Example.
Figure 6:
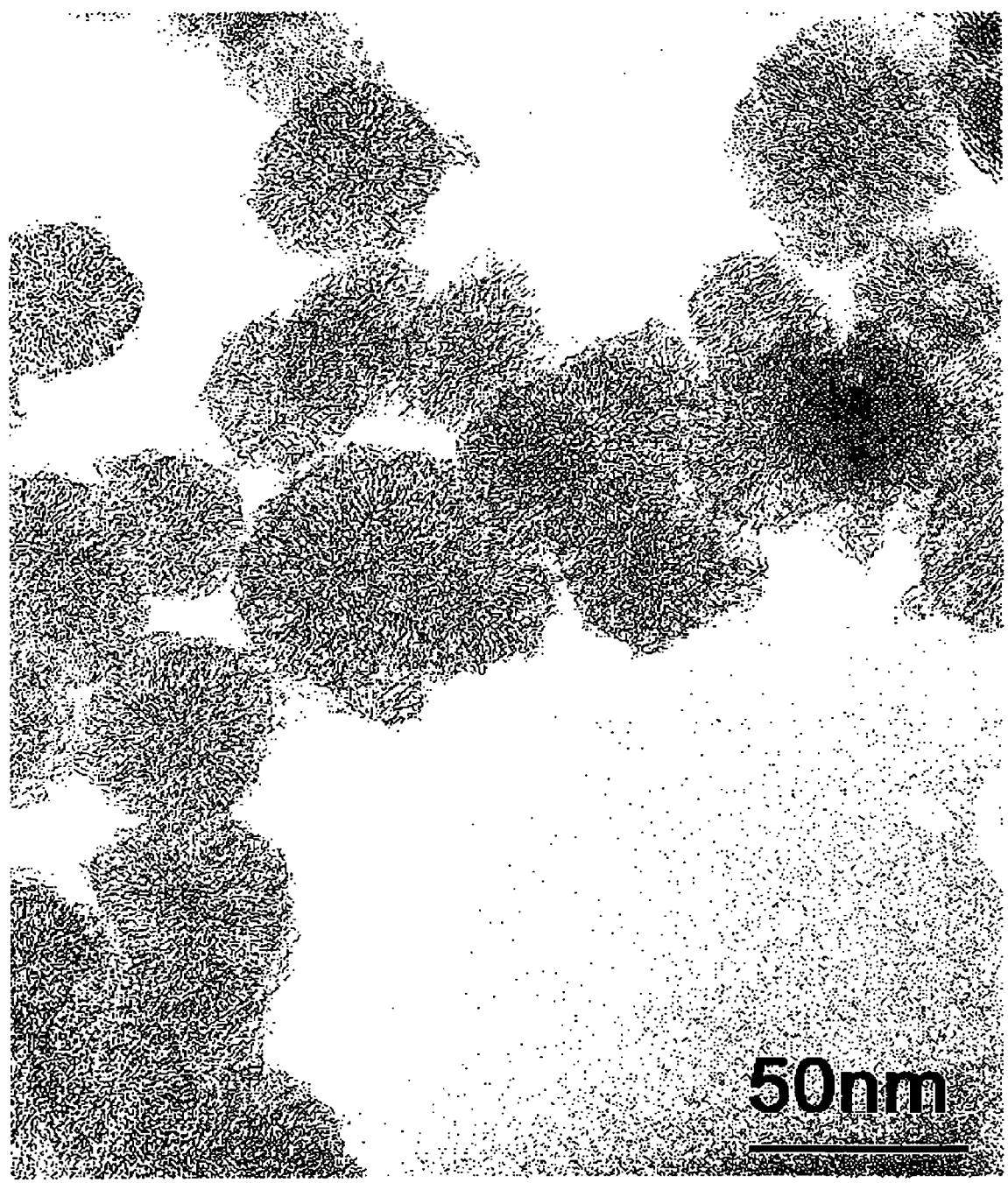
FIG. 6 is a view showing a TEM observation result showing the structure of the carbon nanohorn obtained in Example.

For example, the carbon nanohorn obtained by the above way has forms shown in FIGS. 5 and 6. The observation images shown in the drawings are obtained by performing transmission electron microscope observation of the obtained carbon nanohorns dispersed in a predetermined dispersion medium.

Conventionally, due to the morphological feature, the carbon nanohorn can be classified into a dahlia type, a bud type, and the like. The carbon nanohorn obtained by the apparatus of the invention has the shape different from these conventional shapes. The inventors call the carbon nanohorn having the specific shape carbon nano baby finger (hereinafter referred to as "CNBF" as appropriate) to distinguish the carbon nanohorn obtained by the apparatus of the invention from the conventional carbon nanohorn.

Figure 7:
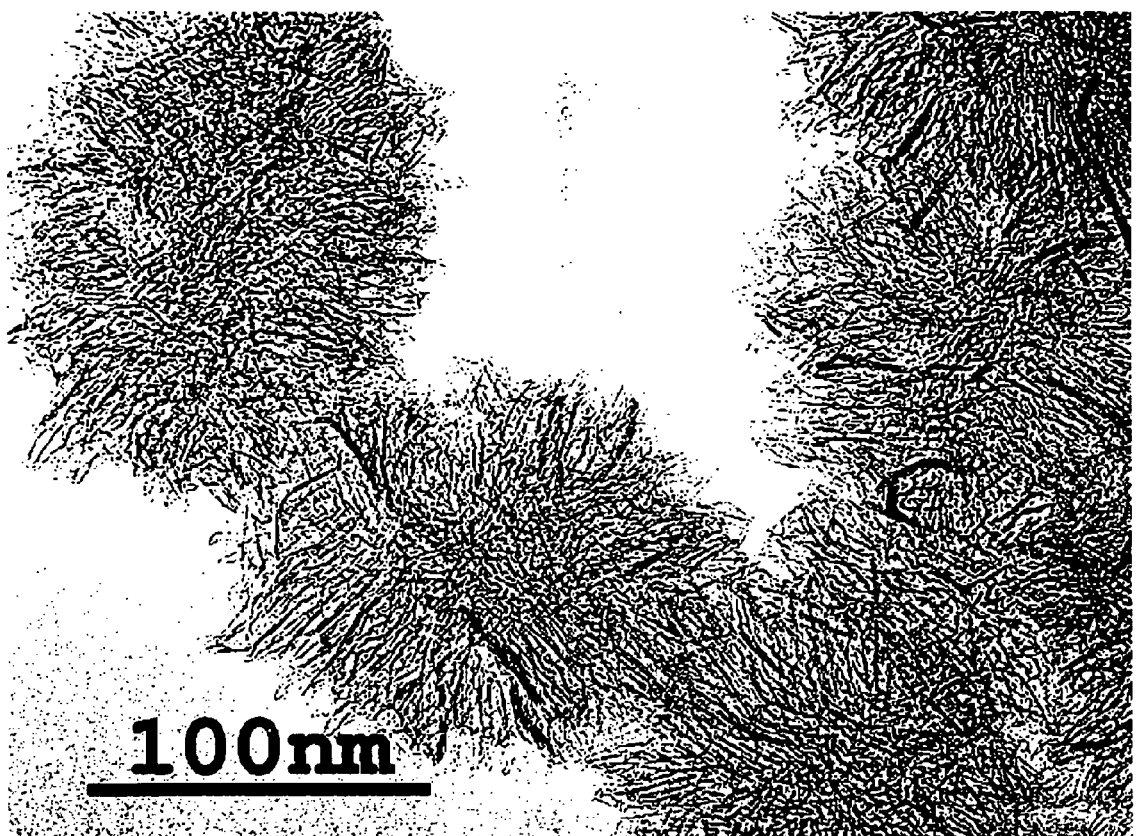
FIG. 7 is a view showing a TEM observation result showing the structure of the carbon nanohorn obtained by a conventional apparatus.
Figure 8:
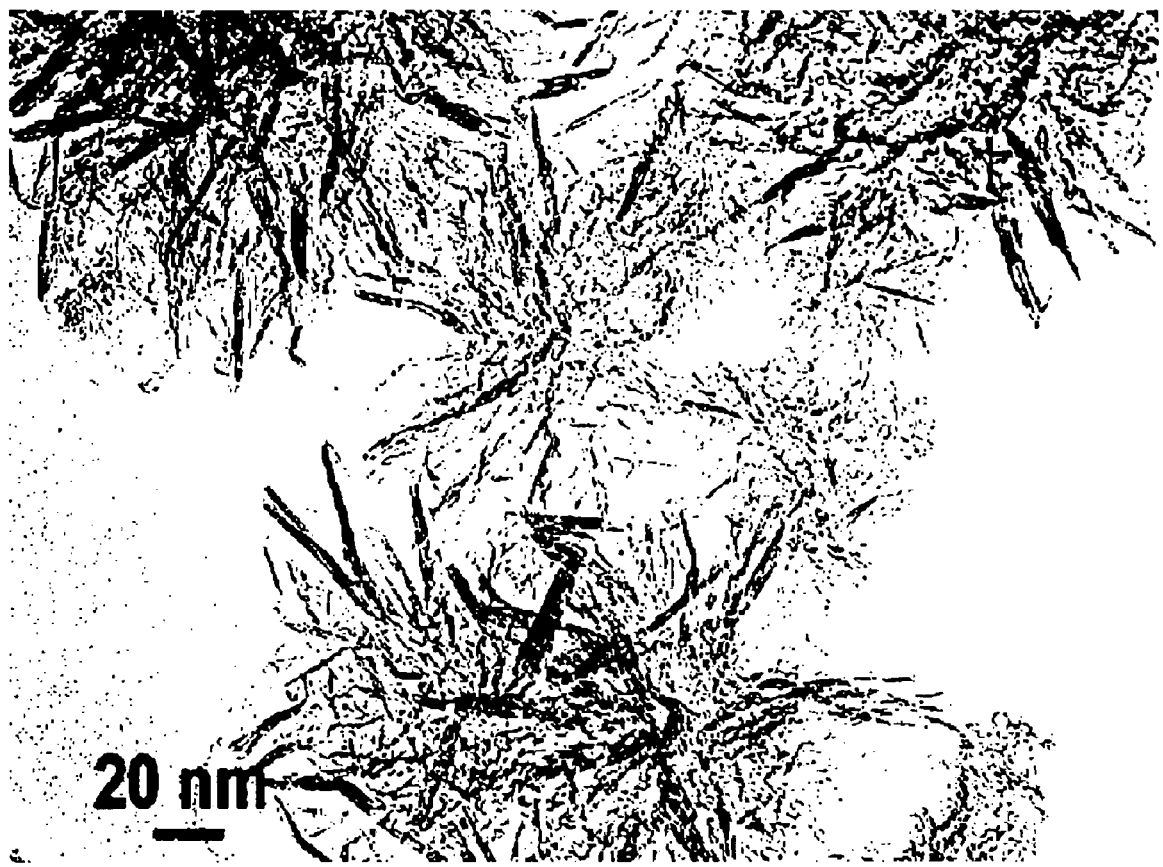
FIG. 8 is a view showing a TEM observation result showing the structure of the carbon nanohorn obtained by a conventional apparatus.

FIGS. 7 and 8 show the dahlia type carbon nanohorn. The dahlia type structure has been produced by using the apparatus with no cooling unit and the graphite rod as the target. As shown in FIGS. 7 and 8, in the dahlia type carbon nanohorn, there are dense parts (black and thick parts in the drawing) in which the graphite sheets overlap one another. The horn structures overlap one another and the horn structures are folded, so that the horns having the various forms are included in the assembly.

On the other hand, the bud type carbon nanohorn has the structure similar to the amorphous structure. There is the morphological feature in which the horn is hardly projected from the assembly.

On the contrary, the CNBF is configured that each nanohorn keeps the independent form and has few overlaps of the horn structures unlike the dahlia type carbon nanohorn. The CNBF has the shape also different from the bud type carbon nanohorn of the aggregated assembly.

With reference to the dimension of the carbon nanohorn assembly, a diameter of the carbon nanohorn assembly ranges from 80 to 120 nm in the dahlia type, and the bud type is smaller than the dahlia type by about 10%. On the other hand, in CNBF, the diameter is not more than 50 nm, and CNBF has the smaller dimension when compared with the dahlia type and bud type carbon nanohorns.

As described above, CNBF has the special structure different from the conventional carbon nanohorns, and CNBF can preferably be applied to a catalyst carrier and the like.

Then, a method of producing the carbon nanohorn assembly 117 with the producing apparatus of FIG. 1 will specifically be described. In the producing apparatus of FIG. 1, high-purity graphite, for example, rod-shaped sintered carbon, compression molding carbon, and the like can be used as the graphite rod 101. The laser beam such as a high-output $CO_2$ gas laser beam is used as the laser beam 103. The irradiation of the graphite rod 101 with the laser beam 103 is performed in an inert gas atmosphere including rare gas such as Ar and He at a pressure, for example, ranging from $10^3$ Pa to $10^5$ Pa. It is preferable that the inert gas atmosphere is generated in the producing chamber 107 after evacuating the producing chamber 107, for example, below the $10^{-2}$ Pa. It is also preferable that output, a spot diameter, and the irradiation angle are adjusted such that power density of the laser beam 103 is substantially kept constant, for example, 20±10 $kW/cm^2$ in the side face of the graphite rod 101.

In the laser beam 103, for example the output is set in the range of 3 kW to 5 kW, for example a pulse width is set in the range of 200 msec to 2000 msec, and preferably the pulse width is set in the range of 750 msec to 1250 msec. Further, for example a quiescent time is set 100 msec or more, preferably the quiescent time is set at least 200 msec. Therefore, overheat of the surface can be suppressed more securely in the graphite rod 101. The preferable irradiation angle is described above with reference to FIG. 9. During the side face of the graphite rod 101 is irradiated with the laser beam 103, the spot diameter can range from 0.5 mm to 5 mm.

During the irradiation with the laser beam 103, the graphite rod 101 is rotated in a circumferential direction at constant speed by the rotating device 115. For example, the number of revolutions is set in the range of 0.05 rpm to 50 rpm.

The apparatus of FIG. 1 has the configuration in which a soot-like substance obtained by the irradiation of the graphite rod 101 with the laser beam 103 is recovered by the carbon nanohorn recovery chamber 119. Alternatively, the soot-like substance can be recovered by depositing it on a proper substrate, or can be recovered by a method of recovering fine particles with a dust bag. Further, the inert gas can also be circulated in the reaction vessel to recover the soot-like substance by a flow of the inert gas.

The soot-like substance obtained with the apparatus of FIG. 1 mainly includes the carbon nanohorn assembly 117. For example, the soot-like substance is recovered as the substance containing the carbon nanohorn assembly 117 of not lower than 90%.

According to the embodiment, the high-purity carbon nanohorn assembly having the uniform horn structure can be obtained. That is, the carbon nanohorn obtained in the embodiment has extremely small part having the graphite sheet structure, so that the carbon nanohorn obtained by the embodiment has the advantage from the viewpoint of device application.

The carbon nanohorn obtained by the embodiment differs largely from the conventional carbon nanohorn in the dimension and the shape. In the range of the typical value of the conventional carbon nanohorn, a horn length along an axial direction ranges from 10 to 30 nm, the diameter orthogonal to the axial direction is not more than 6 nm, and typically the diameter ranges from 2 to 4 nm. On the contrary, in the carbon nanohorn obtained according to the embodiment, the horn length is not more than 10 nm, typically the horn length ranges from 2 to 5 nm, the diameter orthogonal to the axial direction is not more than 4 nm, and typically the diameter ranges from 1 to 2 nm.

The horn length is uneven in the carbon nanohorn obtained by the conventional technology. On the contrary, in the carbon nanohorn obtained in the embodiment, the horn length is relatively even, and can be controlled to the desired dimension by the selection of the producing conditions.

Then, modifications of the producing apparatus shown in the embodiment will be described. In the following descriptions, the same component as the apparatus of FIG. 1 will not be explained.

SECOND EMBODIMENT

Figure 2:
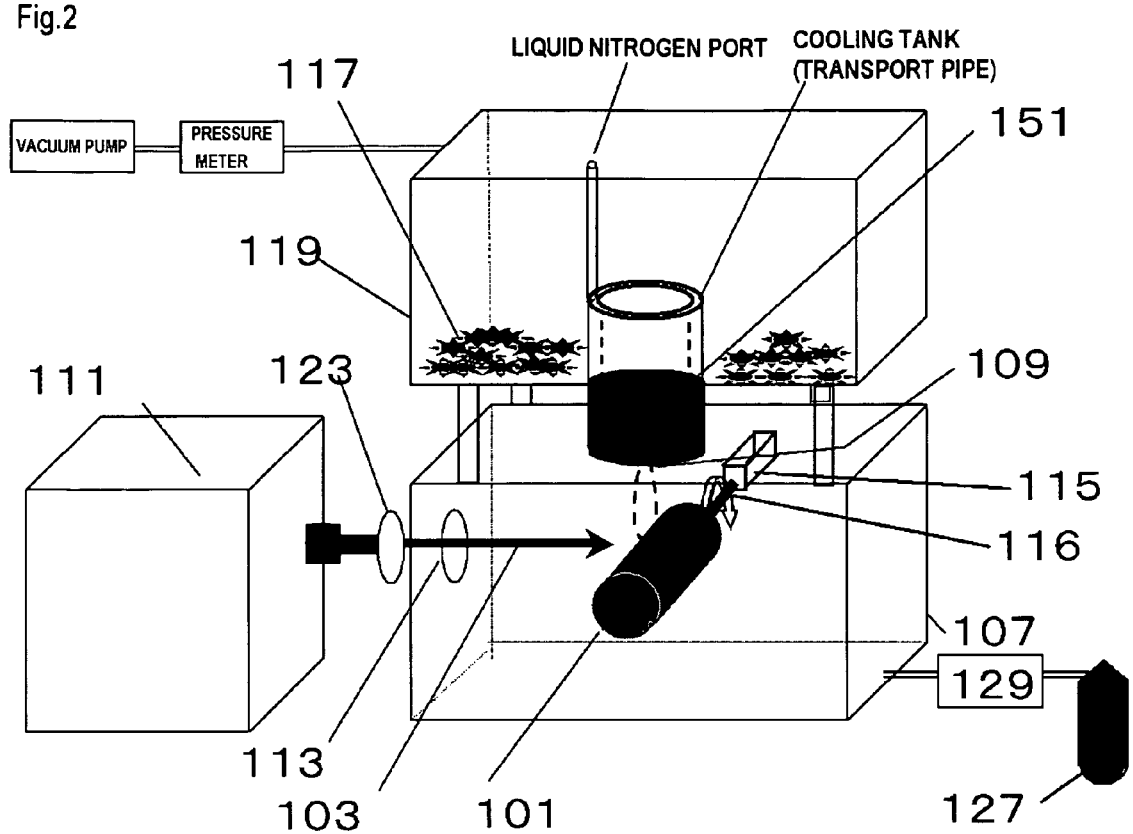
FIG. 2 is a view showing a configuration of a carbon nanohorn producing apparatus according to an embodiment.

FIG. 2 shows a carbon nanohorn producing apparatus according to the present embodiment. The apparatus of the embodiment is configured such that the coolant is accommodated inside a sidewall of the cylindrical recovery pipe 155 in order to function as a coolant tank. The apparatus of the embodiment has the structure in which the inside of the sidewall of the recovery pipe 155 is filled with the coolant. The liquid nitrogen is used as the coolant.

According to the configuration of the embodiment, the carbon vapor passing through the recovery pipe 155 is efficiently cooled from the sidewall of the recovery pipe 155, and the carbon nanohorn having the CNBF structure shown in FIGS. 5 and 6 is stably obtained. Adjusting the filling amount of liquefied gas and the like can control the structure of the carbon nanohorn, obtained by adjusting the cooling temperature.

THIRD EMBODIMENT

Figure 3:
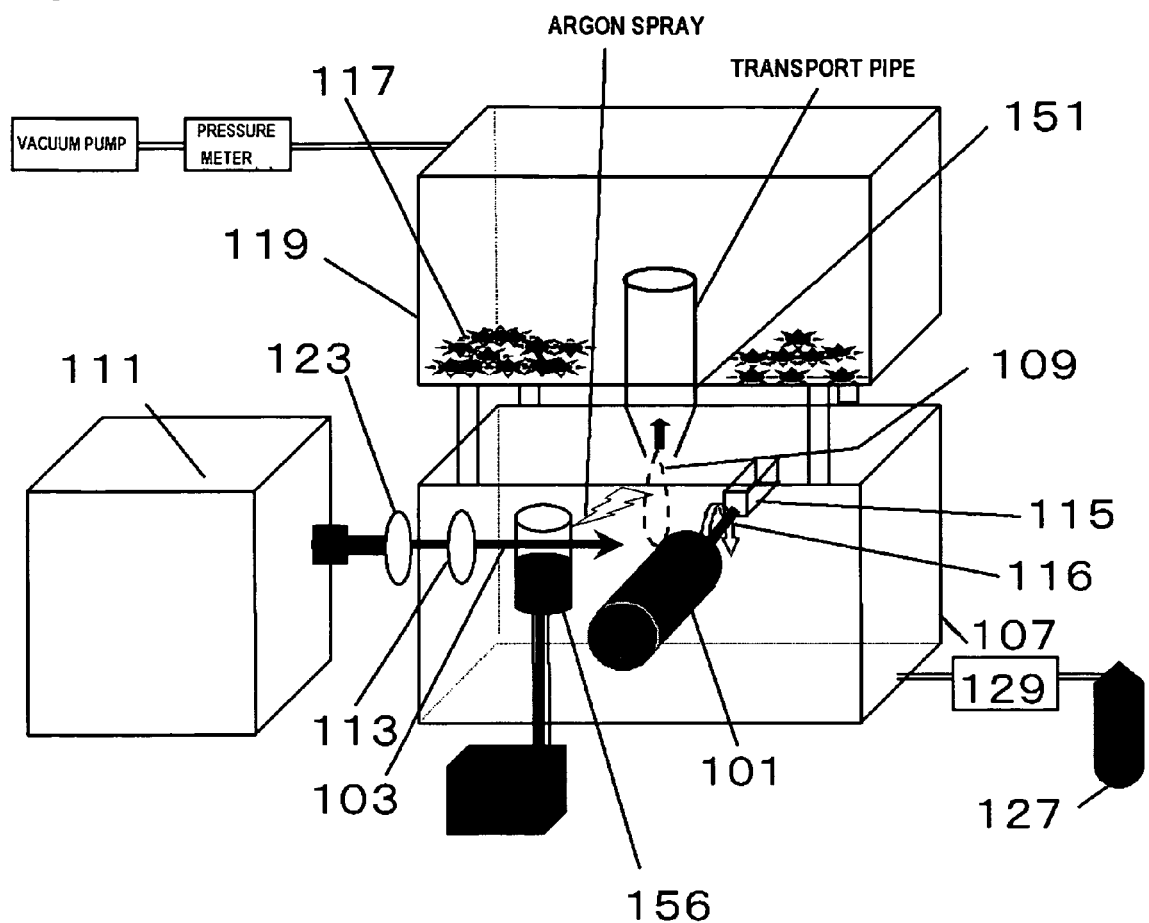
FIG. 3 is a view showing a configuration of a carbon nanohorn producing apparatus according to an embodiment.

In the present embodiment, a vaporizing member which vaporizes liquefied gas to supply the gas to a neighborhood of the graphite target is used as the cooling unit. Referring to FIG. 3, a cup-shaped vessel 156 filled with liquid argon is provided near the graphite rod 101. When the argon is vaporized from the vessel 156, the atmosphere around the vessel is cooled by latent heat. The structure of the embodiment enables the temperature of the plume 109 to be efficiently decreased, and the carbon nanohorn having the CNBF structure shown in FIGS. 5 and 6 can be obtained stably.

FOURTH EMBODIMENT

Figure 4:
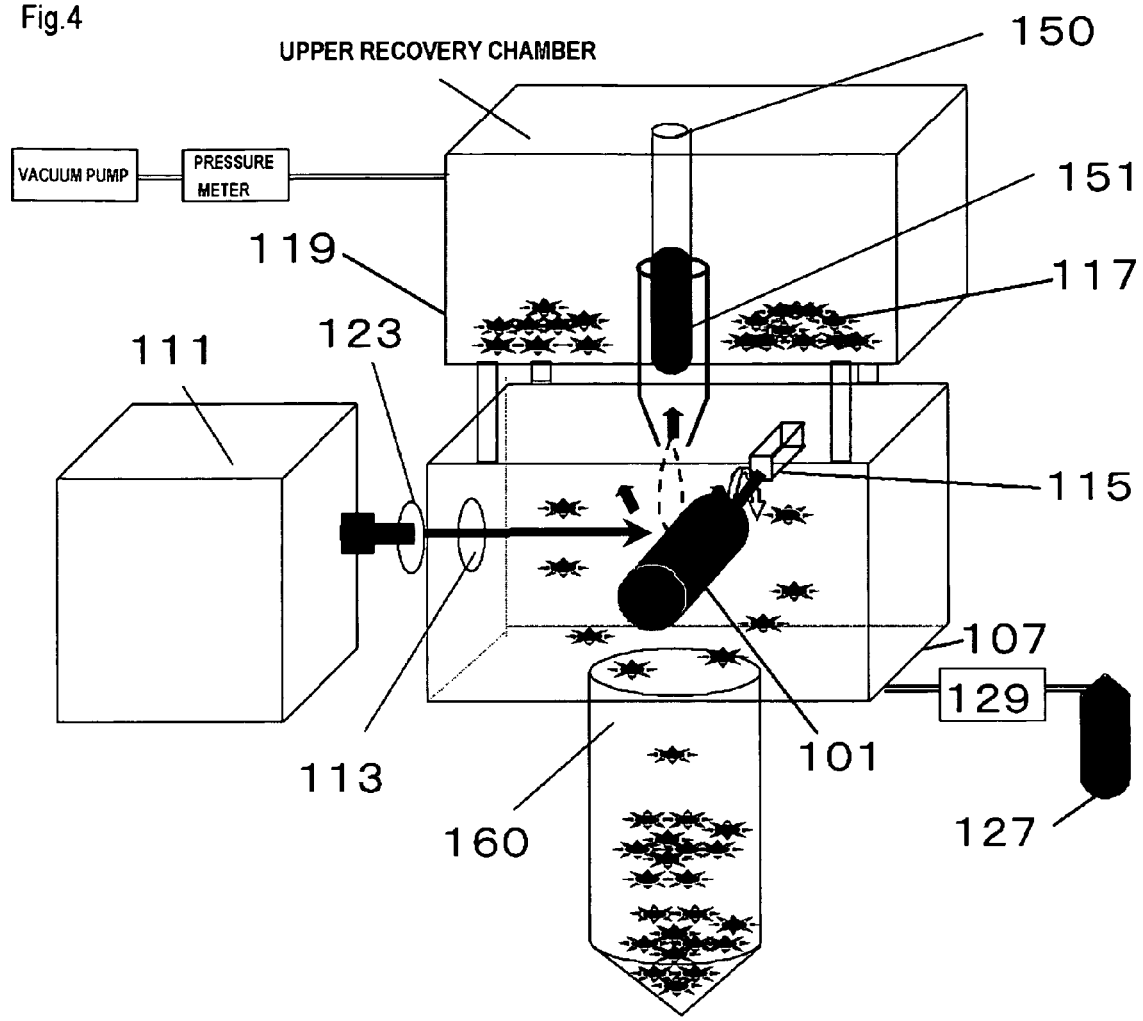
FIG. 4 is a view showing a configuration of a carbon nanohorn producing apparatus according to an embodiment.

FIG. 4 shows a carbon nanohorn producing apparatus according to the present embodiment. In the apparatus of the embodiment, a lower portion recovery chamber 160 is provided below the producing chamber 107. Therefore, while the carbon nanohorn whose shape and the dimensions are controlled by the cooling is recovered by the upper carbon nanohorn recovery chamber 119, the carbon vapor which is not recovered by the upper portion of the apparatus falls down from the recovery pipe 155 by the gravity, and the carbon vapor is recovered by the lower portion recovery chamber 160. According to the configuration, the carbon nano baby finger (CNBF) whose horn is short and the carbon nanohorn whose horn is long are separated from each other, and CNBF is recovered by the carbon nanohorn recovery chamber 119 while the carbon nanohorn is recovered by the lower portion recovery chamber 160. According to the embodiment, plural kinds of carbon nanohorns can be recovered while separated.

As described above, the invention is described based on the embodiments. Those skilled in the art will understand that these embodiments are illustrated by way of example only, various modifications could be made by combining the constituents or the processes, and the modifications are also included in the scope of the invention.

Figure 10:
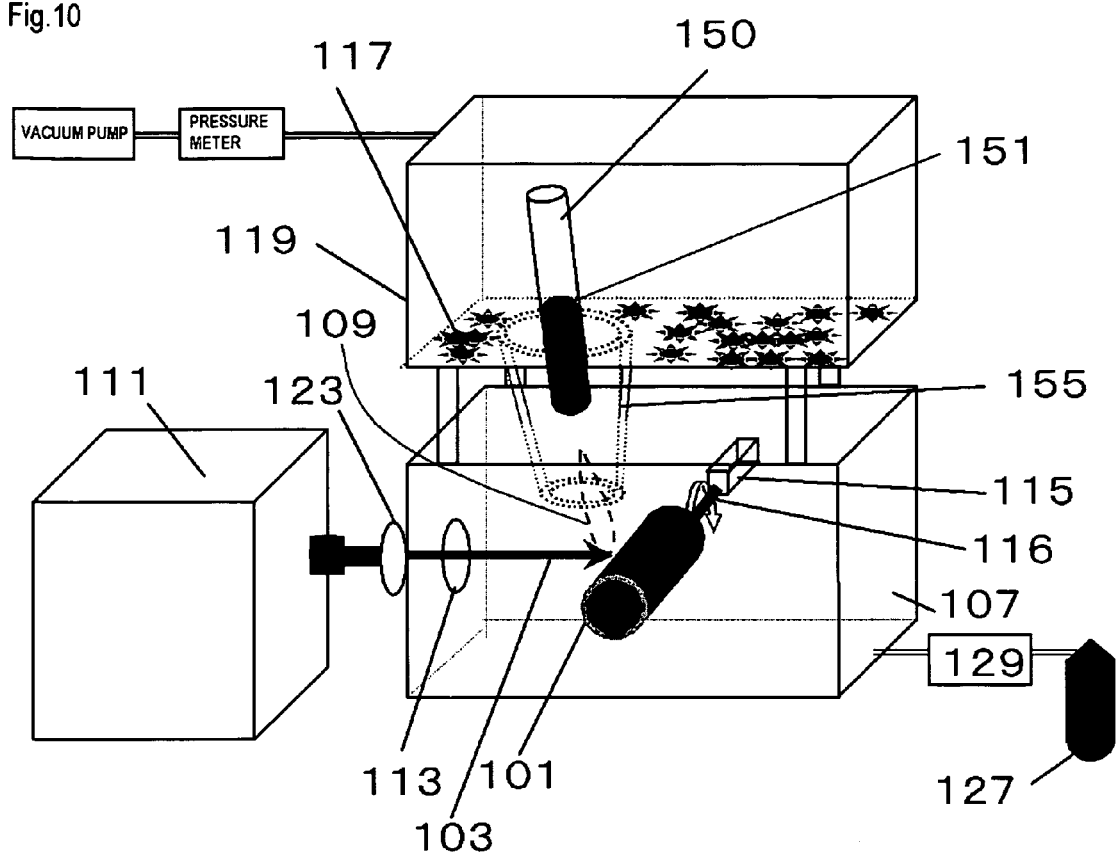
FIG. 10 is a view showing a configuration of a carbon nanohorn producing apparatus according to an embodiment.

For example, as shown in FIG. 10, the recovery pipe 155 may be provided obliquely. When the graphite rod 101 is irradiated with the laser beam 103, the plume 109 is generated toward the direction perpendicular to the tangent of the graphite rod 101 at the radiation position of the laser beam 103. In the nanocarbon producing apparatus shown in FIG. 10, the side face of the graphite rod 101 is irradiated with the laser beam 103, and the irradiation angle is set at about 45°. The recovery pipe 155 is provided in the direction at about 45° relative to the vertical. Therefore, the nanocarbon producing apparatus shown in FIG. 10 has the configuration in which the recovery pipe 155 is provided in the direction perpendicular to the tangent of the graphite rod 101. Accordingly, the carbon vapor can be efficiently introduced to the carbon nanohorn recovery chamber 119 to recover the carbon nanohorn assembly 117.

EXAMPLES

Example 1

In Example 1, the carbon nanohorn assembly 117 was produced with the carbon nanohorn producing apparatus having the configuration shown in FIG. 1.

The rod-shaped sintered carbon having the diameter of 100 mm and the length of 250 mm was used as the graphite rod 101, and was fixed to the rotating device 115 in the producing chamber 107. After the producing chamber 107 was evacuated up to $10^{-3}$ Pa, the Ar gas was introduced such that an atmospheric pressure became $10^5$ Pa. Then, the graphite rod 101 was rotated at the number of revolutions of 6 rpm in the room temperature, and the side face of it was irradiated with the laser beam 103 while moving horizontally at 0.3 mm/sec.

With reference to oscillation conditions of the carbon dioxide gas laser 111, the output was set at 3.5 kW, the power density was set in the range of 5 to 20 kW/cm$^2$, laser irradiation time was set at 1 sec, a standby time was set at 10 sec, and an oscillation frequency was 0.067 Hz. The angle formed by the line segment connecting the radiation position and the center of the circle and the horizontal plane, that is, the irradiation angle was set at 45° in the cross section perpendicular to the lengthwise direction of the graphite rod 101.

In FIG. 1, the recovery pipe 155 was filled with the liquid nitrogen (boiling point: −196° C.). This cooling portion can cool the carbon vapor generated from the graphite rod 101 to the temperature (−110° C.) at which argon is liquefied.

The carbon nanohorn obtained by the apparatus had the following properties.

Form of carbon nanohorn: carbon nano baby finger type
Length of horn: 40 to 50 nm
The ratio (yield) of the carbon nanohorn included in the recovered carbon was 95%.

Example 2

In the example, the carbon nanohorn assembly 117 was produced with the carbon nanohorn producing apparatus having the configuration shown in FIG. 4. The structure of the graphite rod 101, the irradiation conditions of the laser beam source 111, and the like were similar to Example 1. While the carbon nanohorn whose shape and the dimensions are controlled by the cooling is recovered by the upper carbon nanohorn recovery chamber 119, the carbon vapor which has not recovered by the upper portion of the apparatus falls down from the recovery pipe 155 by the gravity and the carbon vapor is recovered by the lower portion recovery chamber 160. According to the configuration, the carbon nano baby finger (CNBF) whose horn is short and the carbon nanohorn whose horn is long are separated from each other, and CNBF is recovered by the carbon nanohorn recovery chamber 119 while the carbon nanohorn is recovered by the lower portion recovery chamber 160.

The carbon nanohorn obtained by the apparatus had the following properties.

(i) The Carbon Nanohorn Recovered by the Carbon Nanohorn Recovery Chamber 119
Form of carbon nanohorn: CNBF
Length of horn: not more than 50 nm, typically 30 nm to 40 nm
Yield: 95%

(ii) The Carbon Nanohorn Recovered by the Lower Portion Recovery Chamber 160
Form of carbon nanohorn: carbon nanohorn (dahlia type and the like)
Length of horn: 80 nm to 120 nm
Yield: 95%

The invention claimed is:
1. A carbon nanohorn producing apparatus comprising:
a target holding unit which holds a graphite target;
a light source which irradiates a surface of said graphite target with light, said light source being a laser beam source, and an irradiation angle of a laser beam emitted by the laser beam source is from 30° to 6°;
a cooling unit which cools carbon vapor vaporized from said graphite target by said light irradiation; and a recovery unit which recovers said carbon vapor cooled by the cooling unit to obtain a carbon nanohorn, wherein said recovery unit includes a recovery chamber and recovery pipe which introduces said carbon vapor to said recovery chamber, and said cooling unit is configured to cool at least inside of said recovery pipe.

2. The carbon nanohorn producing apparatus as claimed in claim 1, wherein one end of said recovery pipe is arranged near said graphite target.

3. The carbon nanohorn producing apparatus as claimed in claim 1, comprising a generation chamber in which said graphite target is placed, wherein said recovery chamber and said generation chamber are communicated with each other through said recovery pipe.

4. The carbon nanohorn producing apparatus as claimed in claim 1, wherein said cooling unit is a tank or a cooling pipe which is provided in said recovery pipe, the tank or the cooling pipe including a coolant.

5. The carbon nanohorn producing apparatus as claimed in claim 1, wherein said cooling unit includes a vaporizing member which vaporizes liquefied gas to supply the gas to a neighborhood of said graphite target.

6. A carbon nanohorn producing method comprising the steps of:

irradiating a surface of a graphite target with light from a laser beam source, and an irradiation angle of a laser beam emitted by the laser beam source is from 30° to 60°;

vaporizing carbon vapor from said graphite target; and obtaining the carbon nanohorn by cooling said carbon vapor to recover said carbon vapor in a recovery unit that includes a recovery chamber and recovery pipe which introduces said carbon vapor to said recovery chamber, and a cooling unit is configured to cool at least inside of said recovery pipe.

7. The carbon nanohorn producing apparatus as claimed in claim 2 comprising a generation chamber in which said graphite target is placed, wherein said recovery chamber and said generation chamber are communicated with each other through said recovery pipe.

8. The carbon nanohorn producing apparatus as claimed in claim 2, wherein said cooling unit is a tank or a cooling pipe which is provided in said recovery pipe, the tank or the cooling pipe including a coolant.

9. The carbon nanohorn producing apparatus as claimed in claim 3, wherein said cooling unit is a tank or a cooling pipe which is provided in said recovery pipe, the tank or the cooling pipe including a coolant.

10. The carbon nanohorn producing apparatus as claimed in claim 1, wherein the irradiation angle of the laser beam is from 40° to 50°.

11. The carbon nanohorn producing apparatus as claimed in claim 1, wherein a lens focuses a laser beam emitted by the laser beam source.

12. The carbon nanohorn producing apparatus as claimed in claim 11, wherein the lens is formed from ZnSe.

13. The carbon nanohorn producing apparatus as claimed in claim 1, wherein the graphite target is a graphite rod adapted to rotate in a circumferential direction at constant speed.

14. The method according to claim 6, wherein the graphite target is a graphite rod rotating in a circumferential direction at constant speed.

15. The method according to claim 6, wherein one end of said recovery pipe is arranged near said graphite target.

16. The method according to claim 6, wherein said cooling unit is a tank or a cooling pipe which is provided in said recovery pipe, the tank or the cooling pipe including a coolant.

* * * * *